United States Patent
Wang et al.

(10) Patent No.: US 9,860,080 B2
(45) Date of Patent: Jan. 2, 2018

(54) METHOD AND DEVICE FOR IMPLEMENTING HIERARCHICAL VIRTUAL PRIVATE LAN SERVICE

(71) Applicant: Huawei Technologies Co., Ltd., Shenzhen (CN)

(72) Inventors: Wenting Wang, Shenzhen (CN); Haibo Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 15/053,835

(22) Filed: Feb. 25, 2016

(65) Prior Publication Data

US 2016/0182253 A1 Jun. 23, 2016

Related U.S. Application Data

(63) Continuation of application No. PCT/CN2014/080287, filed on Jun. 19, 2014.

(30) Foreign Application Priority Data

Aug. 27, 2013 (CN) .......................... 2013 1 0378421

(51) Int. Cl.
*H04L 12/28* (2006.01)
*H04L 12/46* (2006.01)
(Continued)

(52) U.S. Cl.
CPC ...... *H04L 12/4641* (2013.01); *H04L 12/2859* (2013.01); *H04L 12/66* (2013.01);
(Continued)

(58) Field of Classification Search
CPC .................................................. H04L 12/4641
See application file for complete search history.

(56) References Cited

U.S. PATENT DOCUMENTS

2008/0279196 A1* 11/2008 Friskney ............. H04L 12/4645
370/395.53
2009/0122732 A1* 5/2009 Brockners ............... H04L 45/00
370/296

(Continued)

FOREIGN PATENT DOCUMENTS

CN        1697408 A     11/2005
CN      101141330 A      3/2008
(Continued)

OTHER PUBLICATIONS

Lasserre et al., "Virtual Private LAN Service (VPLS) Using Label Distribution Protocol (LDP) Signaling," Network Working Group, Request for Comments 4762, IETF Trust, Reston, Virginia (Jan. 2007).

(Continued)

*Primary Examiner* — Gerald Smarth
(74) *Attorney, Agent, or Firm* — Leydig, Voit & Mayer, Ltd.

(57) ABSTRACT

Provided are a method and device for implementing hierarchical virtual private LAN service, the method comprising: acquiring the group attribute information of at least one remote provider edge (PE), each group attribute information carrying a group identifier of the corresponding remote PE; according to the group identifier of each PE, determining a pseudo wire (PW) group where a PW between PEs belongs, the PW group comprising a horizontal split group or a redundancy protection group; according to the PW group, determining a service forwarding path, thus solving the problem of a complex configuration process and high cost in the implementation of HVPLS via BGP-AD; in addition, when a network topology changes, the PW between the remote PEs is automatically added to the corresponding horizontal split group or the redundancy protection group (Continued)

SPE: label switching forwarding equipment
LSR-ID: identifier of label switching router
Group_Flag: group identifier
UPE: backbone network edge device without any configuration change or static addition, that is, without manual configuration.

14 Claims, 3 Drawing Sheets

(51) Int. Cl.
*H04L 12/761* (2013.01)
*H04L 12/66* (2006.01)
*H04L 12/703* (2013.01)
*H04L 12/721* (2013.01)

(52) U.S. Cl.
CPC .............. *H04L 45/16* (2013.01); *H04L 45/28* (2013.01); *H04L 45/68* (2013.01)

(56) References Cited

U.S. PATENT DOCUMENTS

| | | | |
|---|---|---|---|
| 2009/0201803 A1* | 8/2009 | Filsfils | H04L 12/185 370/222 |
| 2009/0252061 A1* | 10/2009 | Small | H04L 12/4641 370/255 |
| 2012/0063450 A1 | 3/2012 | Pignataro et al. | |
| 2012/0243545 A1 | 9/2012 | Zhang et al. | |
| 2014/0321472 A1 | 10/2014 | Jiang | |
| 2015/0016262 A1* | 1/2015 | Friskney | H04L 12/4645 370/235 |

FOREIGN PATENT DOCUMENTS

| | | |
|---|---|---|
| CN | 101286922 A | 10/2008 |
| CN | 101459673 A | 6/2009 |
| CN | 102143060 A | 8/2011 |
| CN | 102404197 A | 4/2012 |
| CN | 102546413 A | 7/2012 |
| CN | 103188123 A | 7/2013 |
| CN | 103457820 A | 12/2013 |
| EP | 2515484 A1 | 10/2012 |
| WO | WO 2011072448 A1 | 6/2011 |
| WO | WO 2012079026 A2 | 6/2012 |

OTHER PUBLICATIONS

Rosen et al., "Provisioning, Auto-Discovery, and Signaling in Layer 2 Virtual Private Networks (L2VPNs)," Request for Comments 6074, IETF Trust, Reston, Virginia (Jan. 2011).

* cited by examiner

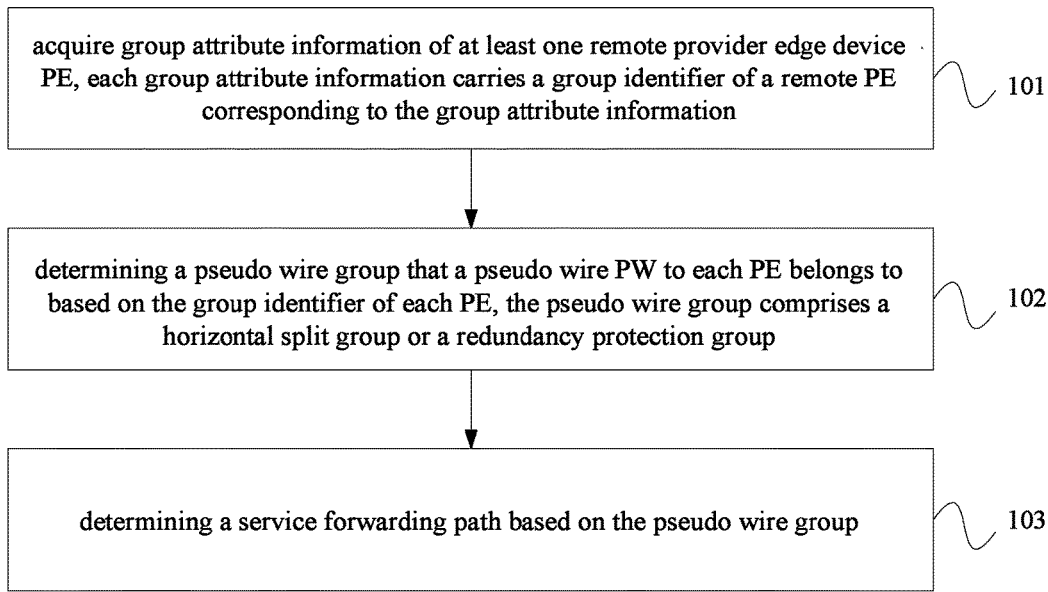

Figure 1

```
+----------------------------------------+
|     Extended community type (2 octets) |   must be 0x900a(Must be 0x900a)
+----------------------------------------+
+----------------------------------------+
|            Group type (1 octet)        |   0x01 represents a horizontal split group type,
+----------------------------------------+   0x02 represents a redundancy protection group
+----------------------------------------+      (0x01 Split Group, 0x02 Redundancy Group)
|             Group id (1 octet)         |   1~255, indicates a group identity
+----------------------------------------+   identifier (1~255, indicate the group id)
+----------------------------------------+
|           Preference (2 octets)        |   0~65535, used for redundancy protection
+----------------------------------------+   group (0~65535, used for Redundancy Group)
+----------------------------------------+
|            Reserve (2 octets)          |   not use yet (MBZ, no use now)
+----------------------------------------+
```

Figure 2

SPE: label switching forwarding equipment
LSR-ID: identifier of label switching router
Group_Flag: group identifier
UPE: backbone network edge device

METHOD AND DEVICE FOR IMPLEMENTING HIERARCHICAL VIRTUAL PRIVATE LAN SERVICE

CROSS-REFERENCE TO RELATED APPLICATIONS

This application is a continuation of International Patent Application No. PCT/CN2014/080287, filed on Jun. 19, 2014, which claims the priority to Chinese Patent Application No. 201310378421.3 filed on Aug. 27, 2013, both of which are hereby incorporated by reference in their entireties.

TECHNICAL FIELD

Embodiments of the present application relate to the field of communication, and particularly to a method and an apparatus for implementing a hierarchical virtual private local area network service.

BACKGROUND

Currently, a hierarchical virtual private local area network service (HVPLS) is introduced in order to avoid bandwidth waste due to a case that each provider edge device (PE) broadcasts an unknown unicast packet, broadcast packet and multicast packet to all opposite end devices in a virtual private local area network service (VPLS). In the HVPLS, the network is hierarchized, and full connection is formed at each level of the network. Data forward between devices at different levels is not based on a horizontal split principle but can be performed to each other.

A border gateway protocol auto-discovery (BGP-AD) way is a way for implementing HVPLS. In this way, information about a member such as other PE is discovered automatically by an extended BGP update packet, and then labels are distributed according to a label distribution protocol (LDP), so as to establish a pseudo wire (PW) from a local virtual switch instance (VSI) to a remote VSI. In order to implement HVPLS, routing is filtered according to a route target (RT) strategy, a horizontal split group is created, and a PW established in the BGP-AD way (BGP-AD PW for short below) is added into the horizontal split group statically.

However, in the process for implementing HVPLS as described above, filtering the routing according to the RT strategy, creating the horizontal split group and statically adding the BGP-AD PW into the horizontal split group cause a complex configuration process and a high cost.

SUMMARY

A method and an apparatus for implementing a hierarchical virtual private local area network service are provided by embodiments of the application, to solve the problem of complex configuration process and high cost in the process for implementing HVPLS in the BGP-AD way.

In a first aspect, a method for implementing a hierarchical virtual local area network service is provided by an embodiment of the application, including:
acquiring group attribute information of at least one remote provider edge device (PE), where each group attribute information carries a group identifier of a remote PE corresponding to the group attribute information;
determining a pseudo wire group that a pseudo wire (PW) to each PE belongs to based on the group identifier of each PE, where the pseudo wire group includes a horizontal split group or a redundancy protection group; and
determining a service forwarding path based on the pseudo wire group.

In conjunction with the first aspect, in a first possible implementation of the first aspect, determining the pseudo wire group that the pseudo wire (PW) to each PE belongs to based on the group identifier of each PE includes:
determining PEs having a same group identifier based on the group identifier of each PE; and
grouping PWs to the PEs having the same group identifier into a same horizontal split group.

In conjunction with the first aspect, in a second possible implementation of the first aspect, determining the pseudo wire group that the pseudo wire (PW) to each PE belongs to based on the group identifier of each PE includes:
determining PEs having a same group identifier based on the group identifier of each PE; and
grouping PWs to the PEs having the same group identifier into a redundancy protection group.

In conjunction with the first possible implementation of the first aspect, in a third possible implementation of the first aspect, determining the service forwarding path based on the pseudo wire group includes:
forwarding the PW in the same horizontal split group to other horizontal split group.

In conjunction with the second possible implementation of the first aspect, in a fourth possible implementation of the first aspect, determining the service forwarding path based on the pseudo wire group includes:
determining a primary-standby relationship among the PWs in the same redundancy protection group based on a label switching router of each PE.

In conjunction with the second possible implementation of the first aspect, in a fifth possible implementation of the first aspect, the group attribute information further carries a preference of each PE;
after grouping the PWs to the PEs having the same group identifier into a redundancy protection group, the method further includes:
determining a primary-standby relationship among the PWs in the same redundancy protection group based on the preference of each PE.

In conjunction with the first aspect, any one possible implementation of the first possible implementation to the fifth possible implementation of the first aspect, in a sixth possible implementation of the first aspect, acquiring the group attribute information of at least one remote provider edge device (PE) includes:
acquiring group attribute information carried in an extended community attribute of the at least one PE; or
acquiring group attribute information carried in a border gateway protocol attribute of the at least one PE.

In a second aspect, an apparatus for implementing a hierarchical local area network service is provided by an embodiment of the application, including:
an acquiring module configured to acquire group attribute information of at least one remote provider edge device (PE), where each group attribute information carries a group identifier of a remote PE corresponding to the group attribute information;
a first determining module configured to determine a pseudo wire group that a pseudo wire (PW) to each PE belongs to based on a group identifier of each PE acquired by the acquiring module, where the pseudo wire group includes a horizontal split group or a redundancy protection group; and a second determining module configured to determine a service forwarding path based on the pseudo wire group.

In conjunction with the second aspect, in a first possible implementation of the second aspect, the first determining module is configured to determine PEs having a same group identifier based on the group identifier of each PE; and group PWs to the PEs having the same group identifier into a same horizontal split group.

In conjunction with the second aspect, in a second possible implementation of the second aspect, the first determining module is configured to determine PEs having a same group identifier based on the group identifier of each PE; and group PWs to the PEs having the same group identifier into a redundancy protection group.

In conjunction with the first possible implementation of the second aspect, in a third possible implementation of the second aspect, the second determining module is configured to forward the PW in the same horizontal split group to other horizontal split group.

In conjunction with the second possible implementation of the second aspect, in a fourth possible implementation of the second aspect, the second determining module is configured to determine a primary-standby relationship among the PWs in the same redundancy protection group based on a label switching router of each PE.

In conjunction with the second possible implementation of the second aspect, in a fifth possible implementation of the second aspect, the group attribute information acquired by the acquiring module further carries a preference of each PE;

the second determining module is configured to determine a primary-standby relationship among the PWs in the same redundancy protection group based on the preference of each PE.

In conjunction with the second aspect, any one possible implementation of the first possible implementation to the fifth possible implementation of the second aspect, in a sixth possible implementation of the second aspect, the acquiring module is configured to acquire group attribute information carried in an extended community attribute of the at least one PE; or acquire group attribute information carried in a border gateway protocol attribute of the at least one PE.

In the method and apparatus for implementing the hierarchical virtual private local area network service according to the embodiments of the application, a local PE acquires the group attribute information of a remote PE connected to the local PE, determines the pseudo wire group that the pseudo wire PW from the local PE to the remote PE belongs to based on the group identifier of each PE in the group attribute information, and further determines the service forwarding path based on the pseudo wire group. In this way, the problem of complex configuration process and high cost in the process for implementing HVPLS in the BGP-AD way is solved, and if a network topology changes, the PW from the local PE to the remote PE is added into the corresponding horizontal split group or the redundancy protection group automatically without changing the configuration or adding statically, that is, without manual configuration.

BRIEF DESCRIPTION OF DRAWINGS

In order to more clearly illustrate the technical solutions in the embodiments of the present application or in the conventional technology, drawings used in the description of the embodiments or the conventional technology will be introduced simply below. Obviously, the drawings in the following description are just some embodiments of the present application. Other drawings can also be obtained by those skilled in the art according to these drawings without any creative work.

FIG. 1 is a flow chart of a method for implementing a hierarchical virtual local area network service according to a first embodiment of the present application;

FIG. 2 is a schematic diagram of a format of an extended community packet in a method for implementing a hierarchical virtual local area network service according the present application;

DESCRIPTION OF EMBODIMENTS

Figure 3:
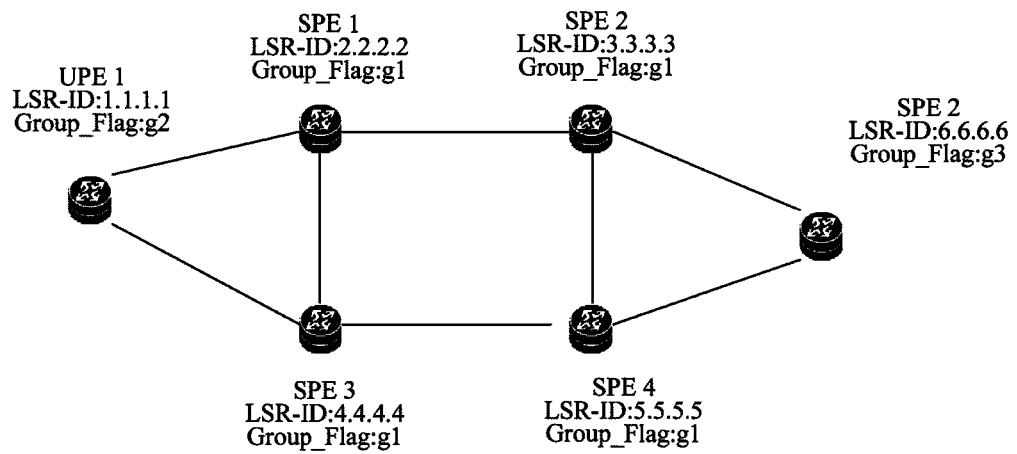
FIG. 3 is a schematic diagram of a network architecture to which the method for implementing the hierarchical virtual local area network service according the present application is applied.

In order to make the object, the technical solutions and advantages of the embodiments of the present application clearer, the technical solutions in the embodiments of the present application will be described hereinafter in conjunction with the drawings in the embodiments of the present application. Obviously, the described embodiments are only a few but not all of embodiments of the present application. All other embodiments obtained by those skilled in the art based on these embodiments of the present application without any creative work will fall within the scope of protection of the present application.

FIG. 1 is a flow chart of a method for implementing a hierarchical virtual local area network service according to a first embodiment of the present application. A provider edge device (PE) in the embodiment is applied to a scenario for dynamically implementing a hierarchical virtual local area network service (HVPLS). Specifically, the embodiment includes following steps 101 to 103.

Step 101 is to acquire group attribute information of at least one remote provider edge device (PE), where each group attribute information carries a group identifier of a remote PE corresponding to the group attribute information.

In general, HVPLS includes two kinds of PEs. One is a backbone network edge device (Ultimate PE, UPE) which is directly connected to a customer edge device (Customer Edge, CE) and a label switching forwarding device (Switching PE, SPE), and the other is a SPE which is connected to UPE and establishes a full connection with other SPE in the HVPLS. The PE in the embodiment refers to an SPE or a UPE unless specially defined.

In this step, a local PE acquires group attribute information of a remote PE connected to the local PE. For example, the local PE receives a protocol packet carrying group attribute information sent from each remote PE. The protocol packet sent from each remote PE includes group attribute information. The group attribute information carries a group identifier of the remote PE. After receiving a protocol packet carrying group attribute information sent from at least one remote PE, the local PE may acquire the group identifier of all the remote PEs from each protocol packet. Specifically, the group identifier is an identifier for identifying whether the PE belongs to a same group as other PE, and is different from an identity identifier for identifying the identity of the PE. For example, each PE has an unique identity identifier, but some PEs have the same group identifier, and PWs from the local PE to these PEs belong to a same horizontal split group or redundancy protection group.

Optionally, the local PE may acquire group attribute information carried in an extended community attribute of at least one PE, or acquire group attribute information carried in a border gateway protocol attribute of at least one PE. Specifically, the group attribute information may be carried in the extended community attribute or the border gateway protocol (BGP). Taking the extended community attribute as an example, a new extended community attribute may be defined and the group attribute information is carried in the community attribute.

Step 102 is to determine a pseudo wire group that a pseudo wire (PW) established with each PE belongs to based on the group identifier of each PE, where the pseudo wire group includes a horizontal split group or a redundancy protection group.

In this step, the PW between PEs in the HVPLS may be established in advance in a way such as BGP-AD. In general, HVPLS includes two kinds of PWs. One is a spoke pseudo wire (Spoke PW) between a UPE and an SPE, and the other is a hub pseudo wire (Hub PW) between SPEs. A process for dynamically implementing HVPLS mainly relates to a process for dynamically establishing the Spoke PW and the Hub PW.

In this step, after acquiring the group attribute information of each remote PE connected to the local PE, the local PE determines a relationship among the PWs established from the local PE to each remote PE based on the group identifier of each PE carried in the group attribute information. For example, the PWs belong to a same horizontal split group, belong to different horizontal split groups, belong to a same redundancy protection group, or belong to different redundancy protection groups. In a case that it is required to reconfigure the horizontal split group and the redundancy protection group due to change of network topology information, the local PE may automatically add the PW from the local PE to the remote PE into a corresponding horizontal split group or redundancy protection group based on the acquired group identifier of the remote PE, without adding statically, i.e., without manual configuration.

Step 103 is to determine a service forwarding path based on the pseudo wire group.

For a certain remote PE, the local PE may determine a subsequent service forwarding path according to a preset strategy after determining a pseudo wire group that a PW from the local PE to the remote PW belongs to. For example, PWs in one horizontal split group is not forwarded in the horizontal split group but is forwarded to other horizontal split group; and a primary PW and a standby PW may be determined from PWs in a same redundancy protection group, and therefore a primary path and a standby path are selected.

It should be noted that forwarding the PW described in the embodiment refers to forwarding a service borne on the PW.

In the method for implementing the hierarchical virtual local area network service according to the embodiment, the local PE acquires the group attribute information of a remote PE connected to the local PE, determines a pseudo group that the pseudo wire PW from the local PE to the remote PE belongs to based on the group identifier of each PE in the group attribute information, and determines the service forwarding path based on the pseudo wire group. In this way, the problem of complex configuration process and high cost in the process for implementing HVPLS in the BGP-AD way is solved, and if a network topology changes, the PW from the local PE to the remote PE is added into the corresponding horizontal split group or the redundancy protection group automatically without changing the configuration or adding statically, i.e., without manual configuration.

Furthermore, in the first embodiment described above, determining the pseudo wire group that the pseudo wire PW to each PE belongs to based on the group identifier of each PE includes: determining PEs having a same group identifier based on the group identifier of each PE; and grouping PWs to the PEs having the same group identifier into a same horizontal split group.

Specifically, the local PE may, according to a preset strategy, group PWs to PEs having the same group identifier into a same horizontal split group based on the acquired group identifier in the group attribute information of each PE and forward the PW in the same horizontal split group to other horizontal split group, for example.

Furthermore, in the first embodiment described above, determining the pseudo wire group that the pseudo wire PW to each PE belongs to based on the group identifier of each PE includes: determining PEs having a same group identifier based on the group identifier of each PE; and grouping PWs to the PEs having the same group identifier into a redundancy protection group.

Specifically, the local PE may, according to a preset strategy, group PWs to PEs having the same group identifier into a same redundancy protection group based on the acquired group identifier in the group attribute information of each PE, and determine a primary PW and a standby PW from the PWs in the same redundancy protection group, so as to select a service primary path and a service standby path, for example. Optionally, the local PE may determine a primary-standby relationship among the PWs in the same redundancy protection group based on a label switching router (LSR-ID) of each PE; or the local PE may determine a primary-standby relationship among the PWs in the same redundancy protection group based on a preference of each PE in a case that the group attribute information carries the preference of each PW.

Furthermore, in the first embodiment described above, the local PE may acquire the group identifier of the PE by acquiring group attribute information carried in an extended community attribute of at least one PE or by acquiring group attribute information carried in a border gateway protocol attribute of at least one PE. Taking the extended community attribute as an example, a new extended community attribute is defined in the embodiment, the community attribute carries the group attribute information of the PE and the group attribute information may carry a group identifier of the PE. FIG. 2 is a schematic diagram of a format of an extended community packet in the method for implementing the hierarchical virtual local area network service according the present application.

With reference to FIG. 2, the extended community attribute includes eight octets. Two octets in the first line: an extended community type represents that the extended community attribute is newly defined in the present application, represented as must be 0x900a for example. One octets in the second line: a group type represents a type of a PW from a local PE to a remote PE, 0x01 represents a horizontal split group type and 0x02 represents a redundancy protection group (Redundancy Group) type, for example. One octets in the third line: a group identifier of a group identity (Group ID), that is, the group attribute information in the present application, may carry a group identifier of each PE and has a range from 1 to 255 (Indicate the group ID) for example. In the present application, for PWs of a same type, the relationship among the PWs can be determined based on the group attribute information. For example, PWs having the same group attribute information may be grouped into a same horizontal split group or redundancy protection group. Two octets in the fourth line: preference represents a preference of each PW (used for Redundancy Group) and has a range from 0 to 65535, for example. After it is determined the redundancy protection group that PWs of a same type belong to, a primary-standby relationship among the PWs in the redundancy protection group may be determined based on the preference. Two octets in the fifth line: a reserve bit (Reserve) is a bit which has not been used yet (no use now).

FIG. 3 is a schematic diagram of a network architecture to which the method for implementing the hierarchical virtual local area network service according the present application is applied. As shown in FIG. 3, the network includes SPE1 to SPE4, UPE1 and UPE2 Specifically, SPE1, SPE2, SPE3 and SPE4 have the same group identifier, i.e., Group-Flag: g1, Group_Flags of UPE1 and UPE2 are g2 and g3 respectively, LSR_ID of UPE is 1.1.1.1, LSR_ID of SPE1 is 2.2.2.2, LSR_ID of SPE2 is 3.3.3.3, LSR_ID of SPE3 is 4.4.4.4, LSR_ID of SPE4 is 5.5.5.5, and LSR_ID of UPE2 is 6.6.6.6.

With reference to FIG. 2 and FIG. 3, in the embodiment, it is assumed that the group type carried in the extended community attribute is 0x01, which represents that the type of PWs from a local PE to each remote PE is a horizontal split group type. In this case, if the group attribute information, i.e., Group ID, is the same, which represents that the PWs from the local PE to each remote PE belong to the same horizontal split group, a service forwarding path follows a principle that the PW in a horizontal split group cannot be forwarded in the horizontal split group and can be forwarded to a different horizontal split group. Hereinafter, the present application is described by taking UPE1 and SPE1 as a local PE respectively.

For UPE1, Spoke PWs from UPE1 to SPE1 and from UPE1 to SPE3 are established. Group_ID carried in an extended community attribute of SPE1 received by UPE1 is g1, and Group_ID carried in an extended community attribute of SPE3 received by UPE1 is g1 It can be seen that SPE1 and SPE3 have the same Group_ID, i.e., the same group identifier, and the PWs from UPE1 to SPE1 and the PW from UPE1 to SPE3 belong to a same horizontal split group. Therefore, according to a principle followed by the service forwarding path, the flow of SPE1 received by UPE1 cannot be forwarded to SPE3, and similarly, the flow of SPE3 received by UPE1 cannot be forwarded to SPE1.

For SPE1, a Spoke PW from SPE1 to UPE1 is established, and Hub PWs from SPE1 to SPE2, from SPE1 to SPE3 and from SPE1 to SPE4 are established. Group_ID carried in an extended community attribute of UPE1 received by SPE1 is g2, and Group_ID carried in extended community attributes of SPE2, SPE3 and SPE4 received by SPE1 are both g1. It can be seen that SPE2 SPE3 and SPE4 have the same Group_ID, i.e., the same group identifier. Group_ID of UPE1 is different from Group_ID of SPE2, SPE3 and SPE4, i.e., has a different group identifier. The Hub_PWs from SPE1 to SPE2, from SPE1 to SPE3 and from SPE1 to SPE4 belong to a same horizontal split group, and the Spoke PW from SPE1 to UPE1 belongs to another horizontal split group. Therefore, according to a service path forwarding principle, the flow of UPE1 received by SPE1 may be forwarded to SPE2, SPE3 and SPE4 arbitrarily; the flow of SPE2 received by SPE1 may be forwarded to only UPE1 but cannot be forwarded to SPE3 and SPE4; the flow of SPE3 received by SPE1 may be forwarded to only UPE1 but cannot be forwarded to SPE2 and SPE4; and the flow of SPE4 received by SPE1 may be forwarded to only UPE1 but cannot be forwarded to SPE2 and SPE3.

In the technical solution described above, a loop in the service forwarding path SPE1->UPE1->SPE3 can be solved by a Multi-Service Transport Platform (MSTP) according to HVPLS defined in Request For Comments (RFC) 4762.

In the technical solution described above, the present application is described by taking a horizontal split group type as the type of PW as an example, and the present application will be described by taking a redundancy protection group type as the type of PW as an example hereinafter.

With reference to FIG. 2 and FIG. 3, in the embodiment, assumed that a group type carried in an extended community attribute is 0x02, which represents that the type of PWs from the local PE to each remote PW is a redundancy protection group type. In this case, if the group attribute information, i.e., Group ID, is the same, which indicates that the PWs from the local PE to each remote PE belong to a same redundancy protection group, a primary-standby relationship among the PWs in the same redundancy protection group may be determined based on a label switching router (LSR_ID) of each PE, so as to determine a service forwarding path. Alternatively, the primary-standby relationship among the PWs in the same redundancy protection group may be determined according to a preference of each PE in the extended community attribute. Hereinafter, the present application is described by taking UPE1 as the local PE.

For UPE1 a Spoke PW (labeled as PW1 ) from UPE1 to SPE1 is established, and a Spoke PW (labeled as PW2) from UPE1 to SPE3 is established. Group_ID carried in an extended community attribute of SPE1 received by UPE1 is g1, and Group_ID carried in an extended community attribute of SPE3 received by UPE1 is g1.It can be seen that SPE1 and SPE3 have the same Group_ID, i.e., the same group identifier. PW1 and PW2 belong to a same redundancy protection group. UPE1 then selects a primary PW and a standby PW. A selection principle is: 1) selecting based on an LSR-ID, a PW from UPE1 to a PE having a smaller LSR-ID is served as the primary PW and a PW from UPE1 to a PE having a larger LSR-ID is served as the standby PW for example; 2) to selecting based on a preference carried in the extended community attribute. UPE1 finally determines a service forwarding path. In the embodiment, assumed that UPE1 selects a primary PW and a standby PW based on the LSR-ID, it can be seen from FIG. 3 that the LSR-ID of SPE1 is less than the LSR-ID of SPE3 then PW1 is the primary PW and PW2 is the standby PW. In this case, UP1 forwards the data flow received from CE side over PW1 but not over PW2 A control protocol packet, for example a bidirectional forwarding detection (Bidirectional Forwarding Detection, BFD) packet, is forwarded over PW1 and PW2 normally.

In addition, in the embodiment described above, besides performing the primary-standby selection based on the LSR-ID or the preference carried in the extended community attribute, SPEs corresponding to the PWs in a same redundancy protection group may be classified to the UPE, and one of the PWs is served as the primary PW and other PWs are served as the standby PWs.

Figure 4:
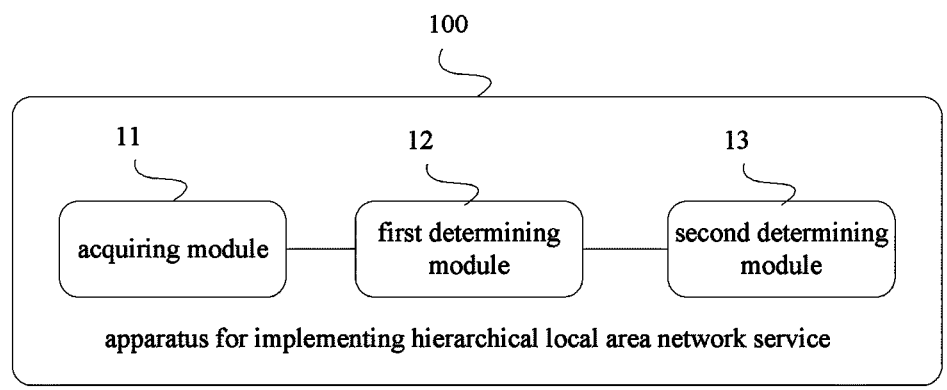
FIG. 4 is a schematic structural diagram of an apparatus for implementing a hierarchical local area network service according a first embodiment of the present application.

FIG. 4 is a schematic structural diagram of an apparatus for implementing a hierarchical local area network service according a first embodiment of the present application. The apparatus for implementing the hierarchical local area network service according the embodiment may be provided in a PE or may be the PE itself. The apparatus is a device embodiment applicable to the embodiment of the present application in FIG. 1, and the implementing process is not described herein any more. Specifically, the apparatus 100 for implementing the hierarchical local area network service according to the embodiment includes:

an acquiring module 11 configured to acquire group attribute information of at least one remote provider edge device (PE), where each group attribute information carries a group identifier of a remote PE corresponding to the group attribute information;

a first determining module 12 configured to determine a pseudo wire group that a pseudo wire (PW) to each PE belongs to based on a group identifier of each PE acquired by the acquiring module 11, where the pseudo wire group includes a horizontal split group or a redundancy protection group; and a second determining module 13 configured to determine a service forwarding path based on the pseudo wire group.

In the apparatus 100 for implementing the hierarchical local area network service according to the embodiment of the present application, group attribute information of a remote PE connected to the local PE is acquired, a pseudo wire group that a pseudo wire (PW) from the local PE to the remote PE belongs to is determined based on the group identifier of each PE in the group attribute information, and then the service forwarding path is determined based on the pseudo wire group. In this way, the problem of complex configuration process and high cost in the process of implementing HVPLS in the BGP-AD way is solved, and if a network topology changes, the PW from the local PE to the remote PE is added into the corresponding horizontal split group or redundancy protection group automatically without changing the configuration or adding statically, that is, without manual configuration.

Furthermore, the first determining module 12 is configured to determine PEs having a same group identifier based on the group identifier of each PE, and group PWs to the PEs having the same group identifier into a same horizontal split group.

Furthermore, the first determining module 12 is configured to determine PEs having a same group identifier based on the group identifier of each PE, and group PWs to the PEs having the same group identifier into a redundancy protection group.

Furthermore, the second determining module 13 is configured to forward a PW in a same horizontal split group to other horizontal split group.

Furthermore, the second determining module 13 is configured to a primary-standby relationship among the PWs in the same redundancy protection group based on a label switching router of each PE.

Furthermore, the group attribute information acquired by the acquiring module 11 further carries a preference of each PE.

The second determining module 13 is configured to determine a primary-standby relationship among the PWs in the same redundancy protection group based on the preference of each PE.

Furthermore, the acquiring module 11 is configured to acquire group attribute information carried in an extended community attribute of at least one PE; or acquire group attribute information carried in a border gateway protocol attribute of at least one PE.

Figure 5:
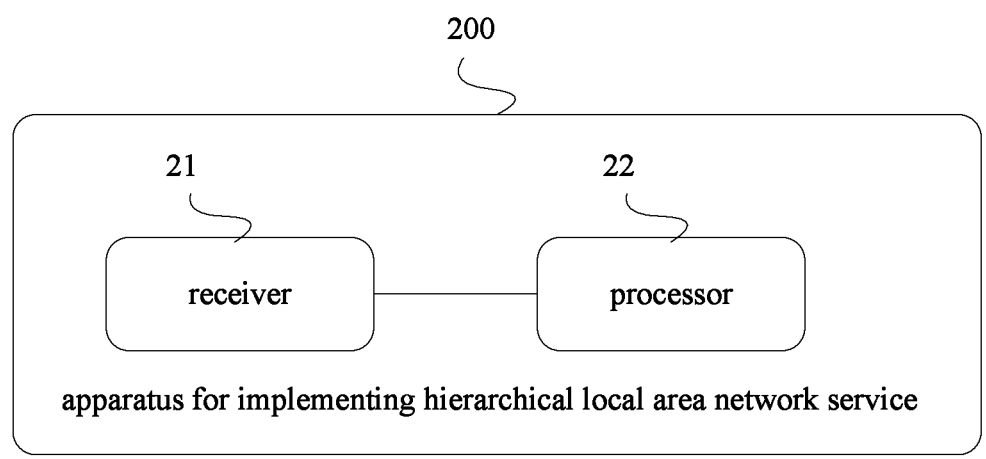
FIG. 5 is a schematic structural diagram of an apparatus for implementing a hierarchical local area network service according a second embodiment of the present application.

FIG. 5 is a schematic structural diagram of an apparatus for implementing a hierarchical local area network service according a second embodiment of the present application. As shown in FIG. 5, the apparatus 200 for implementing the hierarchical local area network service according to the embodiment includes a receiver 21 and a processor 22. Specifically, the receiver 21 is configured to acquire group attribute information of at least one remote provider edge device (PE), where each group attribute information carries a group identifier of a remote PE corresponding to the group attribute information; the processor 22 is configured to: determine a pseudo wire group that a pseudo wire (PW) to each PE belongs to based on the group identifier of each PE, where the pseudo wire group includes a horizontal split group or a redundancy protection group; and determine a service forwarding path based on the pseudo wire group.

Furthermore, determining the pseudo wire group that the pseudo wire (PW) to each PE belongs to based on the group identifier of each PE includes determining PEs having a same group identifier based on the group identifier of each PE; and grouping PWs to the PEs having the same group identifier into a same horizontal split group.

Furthermore, determining the pseudo wire group that the pseudo wire (PW) to each PE belongs to based on the group identifier of each PE includes determining PEs having a same group identifier based on the group identifier of each PE; and grouping PWs to the PEs having the same group identifier into a redundancy protection group.

Furthermore, determining the service forwarding path based on the pseudo wire group includes forwarding a PW in a same horizontal split group to other horizontal split group.

Furthermore, determining the service forwarding path based on the pseudo wire group includes:

determining a primary-standby relationship among the PWs belonging to the same redundancy protection group based on a label switching router of each PE.

Furthermore, the group attribute information further carries a preference of each PE.

After grouping the PWs to the PEs having the same group identifier into the redundancy protection group, the method further includes:

determining a primary-standby relationship among the PWs belonging to the same redundancy protection group based on the preference of each PE.

Furthermore, acquiring the group attribute information of at least one remote provider edge device PE includes acquiring group attribute information carried in an extended community attribute of at least one PE; or acquiring group attribute information carried in a border gateway protocol attribute of at least one PE.

The apparatus for implementing the hierarchical local area network service according to the embodiment may be used to implement each step of the method according to any embodiment of the present application which is applicable to the apparatus for implementing the hierarchical local area network service, and the implementation principle is similar, which is not described herein any more.

In the embodiments of the present application, it should be understood that the disclosed apparatus and method may be implemented in other ways. For example, the device embodiment described above is only schematic, for example, the division of the units is based on logic function, and other ways may also be applied in actual implementation, for example, multiple units or components may be combined or integrated into another system, or some features may be ignored or not executed. In addition, the displayed or discussed coupling, direct coupling or communication connection to each other may be indirect coupling or communication connection via some interfaces, devices or units, or may be in an electrical form, a mechanical form or other form.

The units illustrated as a separated component may be or may not be separated physically, and the component displayed as a unit may be or may not be a physical unit, that is, the components may be located at a same place, or may be distributed on multiple network units, a part of or all units may be selected according to actual needs to realize the object of the embodiments the present application.

In addition, each function unit according to each embodiment of the present application may be integrated into one processing unit, or may also a separate unit physically, or two or more units may be integrated into one unit; the integrated unit described above may be realized in a hardware way, or may also be realized by a hardware and software function unit.

It can be clearly known by those skilled in the art that, in order to conveniently and simply describe, a division for the function modules described above is only exemplified, in actual application, the function allocation described above can be implemented by different function modules based on actual needs, an internal structure of the device can be divided into different function modules, to realize all or a part of functions described above. An operating process of the device described above can refer to a process of the method embodiment described above, which is not described herein any more.

It can be understood by those skilled in the art that all or a few of steps in the method embodiment described above may be realized by hardware related to a program instruction. The program described above may be stored in a computer readable storage medium. The program will execute steps in each method embodiment described above when being executed; and the storage medium described above includes an ROM, an RAM, a magnetic disk or an optical disc, or various medium which can store the program code.

It should be illustrated that the embodiments described above are only used to illustrate the technical solution of the present disclosure, and not to limit the present disclosure; although the present disclosure is illustrated in detail with reference to the embodiments described above, it can be understood by those skilled in the art that modifications can be made to the technical solution in the embodiments described above, or a part of or all technical features can be substituted; and the modifications or substitutions will not enable an essence of the technical solution to depart from a scope of the technical solution of the embodiments of the present disclosure.

What is claimed is:

1. A method for implementing a hierarchical virtual local area network service, comprising:
   acquiring, by a local provider edge device (PE), group attribute information of at least one remote PE, wherein the group attribute information of each remote PE carries a group identifier of the remote PE;
   determining, by the local PE, a pseudo wire group to which a pseudo wire (PW) to each remote PE belongs based on the group identifier of each remote PE, wherein the pseudo wire group comprises a horizontal split group or a redundancy protection group; and
   determining, by the local PE, a service forwarding path based on the determined pseudo wire group;
   wherein determining the pseudo wire group to which the PW to each remote PE belongs comprises:
   determining remote PEs having a same group identifier based on the group identifier of each remote PE; and
   grouping PWs to the remote PEs having the same group identifier into a same horizontal split group.

2. The method according to claim 1, wherein determining the service forwarding path based on the determined pseudo wire group comprises:
   forwarding the PWs in the same horizontal split group to another horizontal split group.

3. The method according to claim 1, wherein acquiring the group attribute information of the at least one remote PE comprises:
   acquiring group attribute information carried in an extended community attribute of the at least one remote PE; or
   acquiring group attribute information carried in a border gateway protocol attribute of the at least one remote PE.

4. An apparatus for implementing a hierarchical local area network service, comprising a processor and a non-transitory computer-readable medium having processor-executable instructions stored thereon, wherein the processor-executable instructions, when executed, facilitate the following:
   acquiring group attribute information of at least one remote provider edge device (PE), wherein the group attribute information of each remote PE carries a group identifier of the remote PE;
   determining a pseudo wire group to which a pseudo wire (PW) to each remote PE belongs based on the group identifier of each remote PE, wherein the pseudo wire group comprises a horizontal split group or a redundancy protection group; and
   determining a service forwarding path based on the determined pseudo wire group;
   wherein determining the pseudo wire group to which the PW to each remote PE belongs comprises:
   determining remote PEs having a same group identifier based on the group identifier of each remote PE; and
   grouping PWs to the remote PEs having the same group identifier into a same horizontal split group.

5. The apparatus according to claim 4, wherein the processor-executable instructions, when executed, further facilitate:
   forwarding the PWs in the same horizontal split group to another horizontal split group.

6. The apparatus according to claim 4, wherein the processor-executable instructions, when executed, further facilitate:
   acquiring group attribute information carried in an extended community attribute of the at least one remote PE; or
   acquiring group attribute information carried in a border gateway protocol attribute of the at least one remote PE.

7. A method for implementing a hierarchical virtual local area network service, comprising:
   acquiring, by a local provider edge device (PE), group attribute information of at least one remote PE, wherein the group attribute information of each remote PE carries a group identifier of the remote PE;
   determining, by the local PE, a pseudo wire group to which a pseudo wire (PW) to each remote PE belongs based on the group identifier of each remote PE, wherein the pseudo wire group comprises a horizontal split group or a redundancy protection group; and determining, by the local PE, a service forwarding path based on the determined pseudo wire group;

wherein determining the pseudo wire group to which the PW to each remote PE belongs comprises:
  determining remote PEs having a same group identifier based on the group identifier of each PE; and
  grouping PWs to the remote PEs having the same group identifier into a redundancy protection group.

8. The method according to claim 7, wherein determining the service forwarding path based on the determined pseudo wire group comprises:
  determining a primary-standby relationship among the PWs in the same redundancy protection group based on a label switching router of each remote PE.

9. The method according to claim 7, wherein the group attribute information further carries a preference of each remote PE; and
  wherein after grouping the PWs to the remote PEs having the same group identifier into the redundancy protection group, the method further comprises:
  determining a primary-standby relationship among the PWs in the same redundancy protection group based on the preference of each remote PE.

10. The method according to claim 7, wherein acquiring the group attribute information of the at least one remote PE comprises:
  acquiring group attribute information carried in an extended community attribute of the at least one remote PE; or
  acquiring group attribute information carried in a border gateway protocol attribute of the at least one remote PE.

11. An apparatus for implementing a hierarchical local area network service, comprising a processor and a non-transitory computer-readable medium having processor-executable instructions stored thereon, wherein the processor-executable instructions, when executed, facilitate the following:
  acquiring group attribute information of at least one remote provider edge device (PE), wherein the group attribute information of each remote PE carries a group identifier of the remote PE;
  determining a pseudo wire group to which a pseudo wire (PW) to each remote PE belongs based on the group identifier of each remote PE, wherein the pseudo wire group comprises a horizontal split group or a redundancy protection group; and
  determining a service forwarding path based on the determined pseudo wire group;
  wherein determining the pseudo wire group to which the PW to each remote PE belongs comprises:
    determining remote PEs having a same group identifier based on the group identifier of each remote PE; and
    grouping PWs to the remote PEs having the same group identifier into a redundancy protection group.

12. The apparatus according to claim 11, wherein the processor-executable instructions, when executed, further facilitate:
  determining a primary-standby relationship among the PWs in the same redundancy protection group based on a label switching router of each remote PE.

13. The apparatus according to claim 11, wherein the group attribute information acquired further carries a preference of each remote PE; and
  wherein the processor-executable instructions, when executed, further facilitate:
  determining a primary-standby relationship among the PWs in the same redundancy protection group based on the preference of each remote PE.

14. The apparatus according to claim 11, wherein the processor-executable instructions, when executed, further facilitate:
  acquiring group attribute information carried in an extended community attribute of the at least one remote PE; or
  acquiring group attribute information carried in a border gateway protocol attribute of the at least one remote PE.

* * * * *